United States Patent
Maslyn et al.

(10) Patent No.: US 9,806,356 B2
(45) Date of Patent: Oct. 31, 2017

(54) SYSTEMS AND METHODS FOR CONTROLLING OXYGEN CONCENTRATION IN A CATHODE OF A FUEL CELL SYSTEM

(71) Applicant: GM GLOBAL TECHNOLOGY OPERATIONS LLC, Detroit, MI (US)

(72) Inventors: Andrew J. Maslyn, Novi, MI (US); Sergio E. Garcia, Commerce Township, MI (US); Balasubramanian Lakshmanan, Rochester Hills, MI (US); Mark P. Adams, Victor, NY (US)

(73) Assignee: GM GLOBAL TECHNOLOGY OPERATIONS LLC, Detriot, MI (US)

( * ) Notice: Subject to any disclaimer, the term of this patent is extended or adjusted under 35 U.S.C. 154(b) by 361 days.

(21) Appl. No.: 14/495,369

(22) Filed: Sep. 24, 2014

(65) Prior Publication Data
US 2016/0087288 A1    Mar. 24, 2016

(51) Int. Cl.
*H01M 8/04*    (2016.01)
*H01M 8/04089*    (2016.01)
(Continued)

(52) U.S. Cl.
CPC .... *H01M 8/04097* (2013.01); *H01M 8/04111* (2013.01); *H01M 8/04455* (2013.01); *H01M 8/04559* (2013.01); *H01M 8/04753* (2013.01); *H01M 8/04761* (2013.01); *H01M 2250/20* (2013.01); *Y02T 90/32* (2013.01)

(58) Field of Classification Search
CPC ............................ H01M 8/04; H01M 8/04097
See application file for complete search history.

(56) References Cited

U.S. PATENT DOCUMENTS

| 5,543,238 A | * | 8/1996 | Strasser | H01M 8/04089 |
| | | | | 429/409 |
| 2007/0065711 A1 | * | 3/2007 | Gopal | H01M 8/04014 |
| | | | | 429/415 |
| 2014/0120446 A1 | * | 5/2014 | Zhang | H01M 8/04761 |
| | | | | 429/444 |

FOREIGN PATENT DOCUMENTS

| JP | 2013-122873 | | 2/2013 | |
| JP | 2013122873 A | * | 6/2013 | ............ H01M 8/04 |

OTHER PUBLICATIONS

JP2013-122873—Machine Translation of Application.

* cited by examiner

*Primary Examiner* — Karie O'Neill Apicella
(74) *Attorney, Agent, or Firm* — Phillips Ryther & Winchester; John P. Davis

(57) ABSTRACT

Systems and methods for improving conditions for anion contaminant removal in a cathode of a PEMFC system are presented. A fuel cell system consistent with certain embodiments may include a cathode compartment having a compressor coupled thereto. The compressor may be configured to receive an input cathode gas via a compressor input and supply the input cathode gas to the cathode compartment via a compressor output. The fuel cell system may further include a cathode gas recirculation value coupled to the cathode compartment configured to receive a cathode exhaust gas output and to selectively provide at least a portion of the cathode exhaust gas output to the compressor input. Consistent with certain embodiments disclosed herein, the compressor may be further configured to supply at least a portion of the cathode exhaust gas output to the cathode compartment via the compressor output.

12 Claims, 4 Drawing Sheets

(51) Int. Cl.
  *H01M 8/04111*   (2016.01)
  *H01M 8/0444*    (2016.01)
  *H01M 8/04537*   (2016.01)
  *H01M 8/04746*   (2016.01)

SYSTEMS AND METHODS FOR CONTROLLING OXYGEN CONCENTRATION IN A CATHODE OF A FUEL CELL SYSTEM

TECHNICAL FIELD

This disclosure relates to systems and methods for managing a fuel cell system. More specifically, but not exclusively, this disclosure relates to systems and methods for controlling oxygen concentration in a cathode subsystem of a fuel cell system.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., using electric drive motors and the like) and/or via an intermediate battery system. Hydrogen is one possible fuel that may be used in a FC system. Hydrogen is a clean fuel that can be used to efficiently produce electricity in a FC. A hydrogen FC system is an electrochemical device that may include an electrolyte between an anode and a cathode. The anode receives hydrogen gas and the cathode receives oxygen or air. The hydrogen gas is dissociated in the anode to generate free hydrogen protons and electrons. The hydrogen protons may be selectively conducted across the electrolyte. The electrons from the anode cannot pass through the electrolyte, and thus are directed through a load to perform work before being sent to the cathode. The hydrogen protons react with the oxygen and the electrons in the cathode to generate water.

Proton exchange membrane fuel cells ("PEMFC") may be used in FC-powered vehicles. A PEMFC generally includes a solid polymer electrolyte proton conducting membrane, such as a perfluorosulfonic acid membrane. An anode and cathode included in a PEMFC may include finely divided catalytic particles (e.g., platinum particles) supported on carbon particles and mixed with an ionomer. A catalytic mixture may be deposited on opposing sides of the membrane.

The ability to remove anion contaminant from the cathode is a consideration in achieving continued PEMFC system performance over time. To improve conditions for cathode anion contaminant removal, conventional PEMFC systems may include low cathode stoichiometry, thereby forcing the voltage of the PEMFC system lower under moderate load. Such methods, however, may result in lower stability and poorer current distribution across active catalyst areas in the PEMFC system.

SUMMARY

Systems and methods presented herein may be utilized in connection with improving conditions for anion contaminant removal in a cathode of a PEMFC system. In some embodiments, a PEMFC system may include an anode compartment and a cathode compartment. As used herein, a PEMFC system may include a single cell or, alternatively, may include multiple cells arranged in a stack configuration. The cathode compartment may be coupled to a cathode input line associated with a cathode loop of the PEMFC system. The anode compartment may be coupled to an anode input line associated with an anode loop of the PEMFC system.

In certain embodiments, an exhaust gas recirculation ("EGR") valve may be included in a cathode loop of a PEMFC system to recirculate cathode exhaust to an inlet of a compressor in the cathode loop. In some embodiments, controlling recirculation of the cathode exhaust may control oxygen concentration in the cathode. Lower oxygen concentration in the cathode under high power conditions may result in increased bulk oxygen transport resistance, thereby resulting in lower limiting current in the PEMFC system. In certain embodiments, this may result in lower PEMFC system voltage with moderate load and heat generation conditions. In some embodiments, such conditions may allow for improved conditions for anion contaminant removal in the cathode of a PEMFC system. Recirculating cathode exhaust gas under low load may further reduce stack voltage to certain threshold levels while reducing the need to draw load to the battery (e.g., via voltage suppression operations) or force a large voltage cycle (e.g., via a standby operation or the like).

A fuel cell system consistent with certain embodiments may include a cathode compartment having a compressor coupled thereto. The compressor may be configured to, among other things, receive an input cathode gas (e.g., ambient air, oxygen, etc.) via a compressor input and supply the input cathode gas to the cathode compartment via a compressor output. The fuel cell system may further include a cathode gas recirculation value coupled to the cathode compartment configured to receive a cathode exhaust gas output and to selectively provide at least a portion of the cathode exhaust gas output to the compressor input. Consistent with certain embodiments disclosed herein, the compressor may be further configured to supply at least a portion of the cathode exhaust gas output to the cathode compartment via the compressor output.

In some embodiments, operation of the exhaust gas recirculation value may be controlled by a control system. Among other things, the control system may be configured to control the operation of the exhaust gas recirculation valve by selectively actuating the value. For example, the control system may selectively actuate the value based on feedback information associated with the fuel cell system such as an output voltage of the fuel cell system and/or an oxygen concentration in the cathode compartment. In certain embodiments, the control system may be further configured to receive measurement information associated with an output voltage of the fuel cell system and to implement at least one operation of the fuel cell system associated with a particular oxygen concentration threshold level in the cathode compartment based on the measurement information exceeding at least one threshold (e.g., cathode anion contaminant removal and/or the like).

In further embodiments, a method for managing oxygen concentration in a cathode compartment of a fuel cell system may include receiving an input cathode gas at a compressor input. An input cathode gas may be supplied to the cathode compartment from a compressor output. A cathode gas output may be received at an exhaust gas recirculation valve. At least a portion of the cathode gas output may be selectively provided from the exhaust gas recirculation valve to the compressor input. In addition, at least a portion of the cathode exhaust gas output may be supplied to the cathode compartment from the compressor output.

In certain embodiments, the operation of the exhaust gas recirculation valve may be controlled using a fuel cell control system. For example, the control system may selectively actuate the exhaust gas recirculation valve. In certain embodiments, selectively actuating the exhaust gas recirculation valve may include selectively actuating the exhaust gas recirculation valve based on feedback information associated with the fuel cell system. The feedback information may include, among other things, an output voltage of the fuel cell system and/or an oxygen concentration in the cathode compartment. The method may further include receiving measurement information associated with an output voltage of the fuel cell system and implementing at least one operation of the fuel cell system associated with a particular oxygen concentration threshold level in the cathode compartment (e.g., cathode anion contaminant removal) based on the measurement information exceeding at least one threshold.

In some embodiments, the aforementioned method may be performed by control electronics associated with a PEMFC system and/or implemented using a non-transitory computer-readable medium storing associated executable instructions.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Systems and methods provided herein may be utilized in connection with managing oxygen concentration in a cathode of a PEMFC system. In certain embodiments, oxygen concentration in a cathode of a PEMFC system may be controlled by selectively recirculating cathode exhaust through the cathode. In some embodiments, lowering oxygen concentration in the cathode consistent with embodiments disclosed herein may, among other things, improve conditions for anion contaminant removal in the cathode of the PEMFC system.

Figure 1:
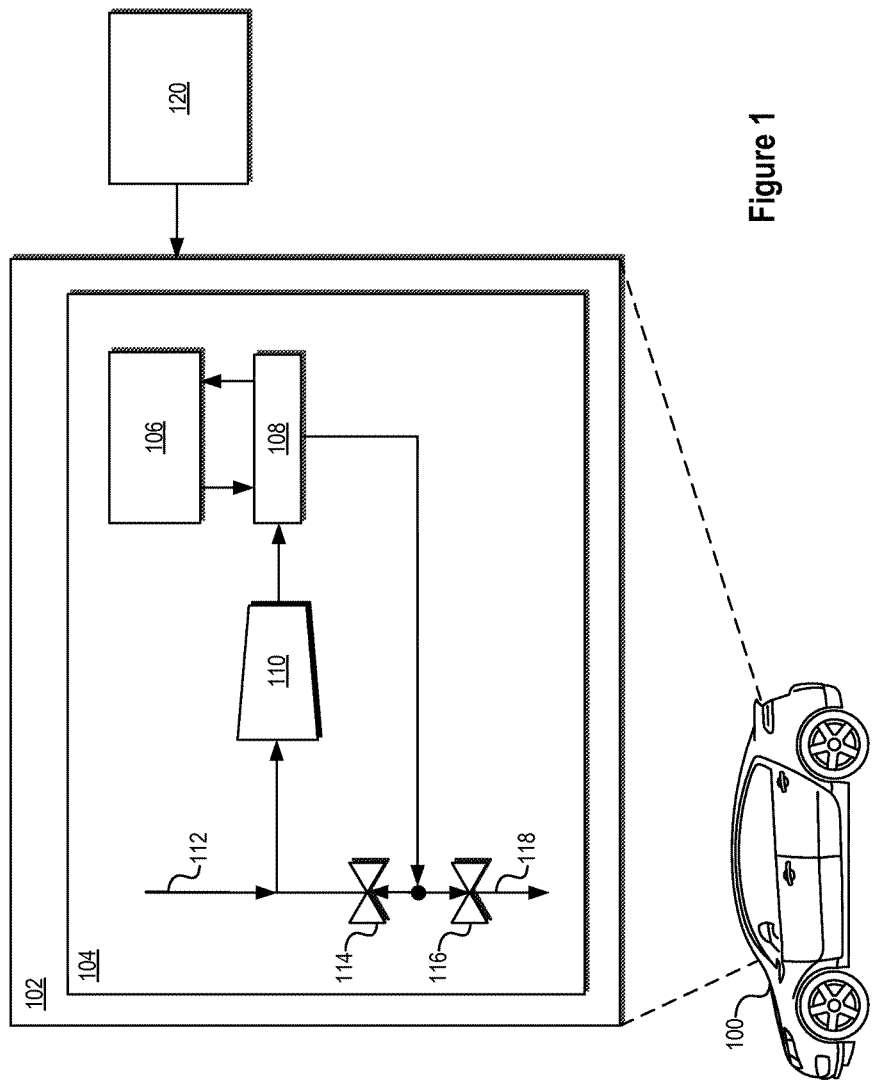
FIG. 1 illustrates a conceptual flow diagram of a cathode loop of a PEMFC system consistent with embodiments disclosed herein.

FIG. 1 illustrates a conceptual flow diagram of a cathode loop 104 of a PEMFC system 102 included in a vehicle 100 consistent with embodiments disclosed herein. The vehicle 100 may be a motor vehicle, a marine vehicle, an aircraft, and/or any other type of vehicle, and may include any suitable type of drivetrain for incorporating the systems and methods disclosed herein. Additional embodiments of the disclosed systems and methods may be utilized in connection with any other type of FC systems including, for example, stationary FC systems (e.g., generators). As illustrated, vehicle 100 may include a PEMFC system 102 configured to provide electrical power to certain components of the vehicle 100. For example, the PEMFC system 102 may be configured to provide power to electric drivetrain components of the vehicle 100.

In some embodiments, the PEMFC system 102 may be configured to directly provide power to electric drivetrain components. In certain embodiments, the PEMFC system 102 may be configured to provide power to electric drivetrain components via an intermediate battery system. In further embodiments, the PEMFC system 102 may be configured to provide power to one or more other battery systems including low voltage battery systems (e.g., lead-acid 12V automotive batteries) that supply electric energy to a variety of vehicle 100 systems including, for example, electric coolant pumps, lighting systems, audio systems, and/or the like.

The PEMFC system 102 may include a single cell or multiple cells arranged in a PEMFC stack 106 configuration, and may include certain PEMFC system elements and/or features described above. In some embodiments, the PEMFC stack 106 may receive a cathode input gas that may comprise oxygen or air (e.g., ambient inlet air 112). During operation, a portion of the cathode input gas (e.g., oxygen) may not be consumed by the PEMFC stack 106 and may thus be output as a cathode exhaust gas that may include water. Water included in the cathode exhaust gas may comprise water vapor and/or liquid water. In certain embodiments, this water may be captured by a water vapor transfer ("WVT") unit 108 in communication with the PEMFC stack 106.

In some embodiments, water captured by the WVT unit 108 may be utilized in connection with humidifying cathode input airflow. In some embodiments, cathode inlet air may be cooled using a charge air cooler ("CAC") (not shown) in communication with the WVT unit 108 prior to ambient inlet air 112 being transferred to the WVT unit 108. In further embodiments, cooling ambient inlet air 112 using the CAC may allow the air to be at a better temperature for facilitating water vapor transfer.

Input 112 and/or exhaust gases 118 may be circulated in the illustrated PEMFC system 102 using one or more pumps and/or compressors. For example, in some embodiments, a compressor 114 may be in communication with the WVT unit 108 and/or other components of the cathode loop 104 and be configured to circulate certain gases (e.g., ambient inlet air 112 and/or hydrogen and/or outlet exhaust gases 118) associated with the PEMFC stack 106 and/or related systems (e.g., WVT unit 108, etc.).

In some embodiments, the PEMFC system 102 may include an EGR valve 114 disposed in the cathode loop 104. In certain embodiments, the EGR valve 114 may be configured to selectively allow recirculation of cathode exhaust to an inlet of the compressor 110. In certain embodiments, controlling recirculation of the cathode exhaust using the EGR valve 114 may control oxygen concentration in the cathode. For example, in certain embodiments, by selectively recirculating the cathode exhaust using the EGR valve, oxygen concentration in the cathode may be lowered.

In certain embodiments, one or more positions of the EGR valve 114 may be associated with one or more oxygen concentration levels in the cathode of the PEMFC system 102. For example, in a first position of the EGR valve 114, a lower amount of cathode exhaust may be recirculated through the cathode of the PEMFC system 102, thereby resulting in oxygen concentration in the cathode that is relatively closer to oxygen concentration in the cathode without cathode exhaust recirculation. In a second position of the EGR valve 114, an increased amount of cathode exhaust may be recirculated through the cathode of the PEMFC system 102, thereby resulting in relatively lower oxygen concentration in the cathode.

In certain embodiments, a back pressure valve 116 included in the cathode loop 104 may operate to, at least in part, manage and/or otherwise control flow of gasses within the cathode loop 104 and/or exhaust gases 118 from the cathode loop 104. In some embodiments, the back pressure valve 116 may be configured to manage pressure in one or more locations of the cathode loop 104 within one or more thresholds. In further embodiments, the back pressure valve 116 may operate in conjunction with the EGR valve 114 in connection with recirculating cathode exhaust gasses in the cathode loop 104.

Under higher power conditions, lower oxygen concentration in the cathode may result in increased bulk oxygen transport resistance and associated lower limiting currents in the PEMFC system 102. In certain embodiments, such conditions may result in lower PEMFC system 102 output voltage with moderate load and heat generation conditions. In some embodiments, such conditions may allow for improved conditions for anion contaminant removal in the cathode of a PEMFC system 102.

The PEMFC system 102 and/or associated systems and/or components may be communicatively coupled with an associated control system 120. The control system may be configured to monitor and control certain operations of the PEMFC system 102 and/or associated systems and/or components. For example, the control system 120 may be configured to monitor and control startup, shutdown, charging, and/or discharging operations of the FC system 102. Similarly, the control system 120 may be configured to monitor and/or control operations of the EGR valve 114 and/or other associated systems and/or components of the FC system 102 in connection with embodiments of the disclosed systems and methods.

In certain embodiments, a position of the EGR valve 114 may be controlled and/or otherwise managed by the control system 120 and/or any other suitable system based on feedback information regarding an operational condition of the PEMFC system 102. For example, in some embodiments, the position of the EGR valve 114 may be controlled based on a measured stack voltage (e.g., measured stack voltage at a particular load). In further embodiments, the position of the EGR valve 114 may be controlled based on information regarding an oxygen concentration in the cathode of the PEMFC system 102 (e.g., a measured oxygen concentration or the like).

Figure 2:
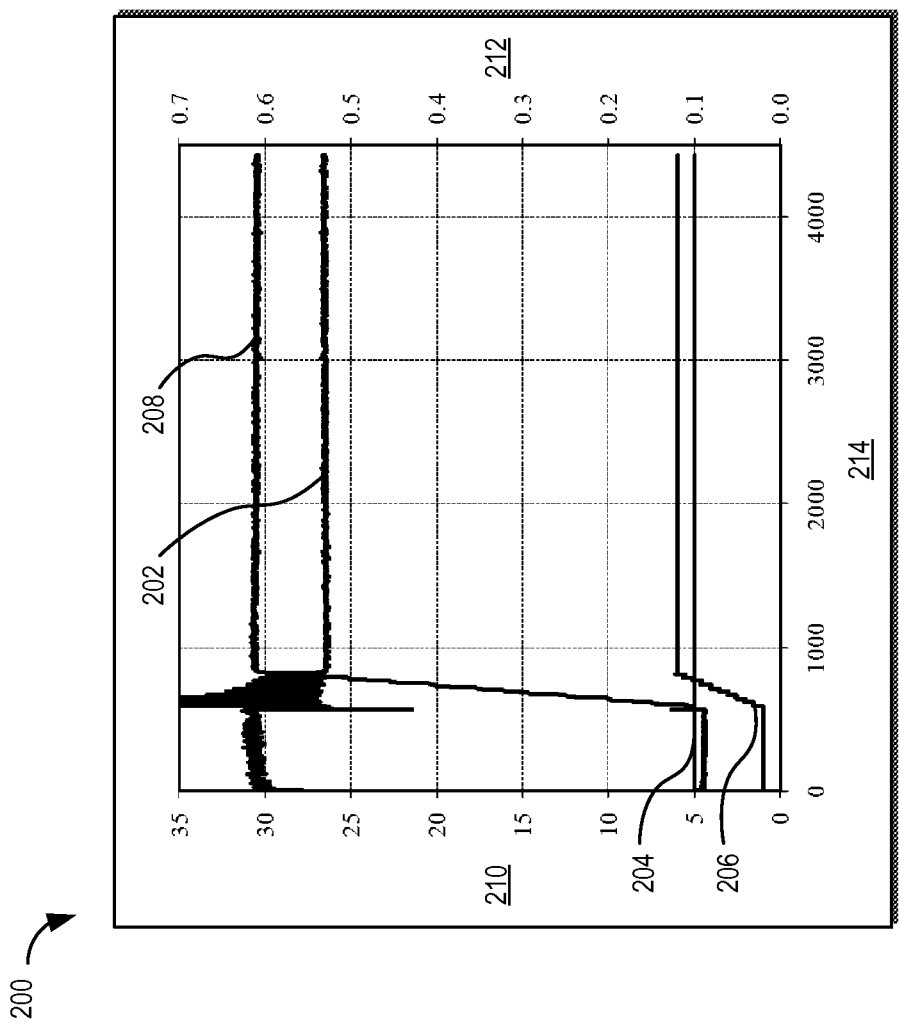
FIG. 2 illustrates a graph showing an exemplary relationship between stoichiometric mixture, flow rate, oxygen concentration, and current density in a cathode of a PEMFC system consistent with embodiments disclosed herein.

FIG. 2 illustrates a graph 200 showing an exemplary relationship between a stoichiometric mixture 202, gas flow rate 204 (i.e., a volumetric flow rate in standard liter per minute units or the like), oxygen concentration 206, and current density 208 in a cathode of a PEMFC system consistent with embodiments disclosed herein. Axis 210 of graph 200 represents a percentage change of the stoichiometric mixture 202, cathode gas flow rate 204, oxygen concentration 206, and current density 208 in a cathode of a PEMFC system, axis 212 of graph 200 represents a current density of the PEMFC system (e.g., measured in A/cm$^2$), and axis 214 of graph 200 represents time in seconds.

Figure 3:
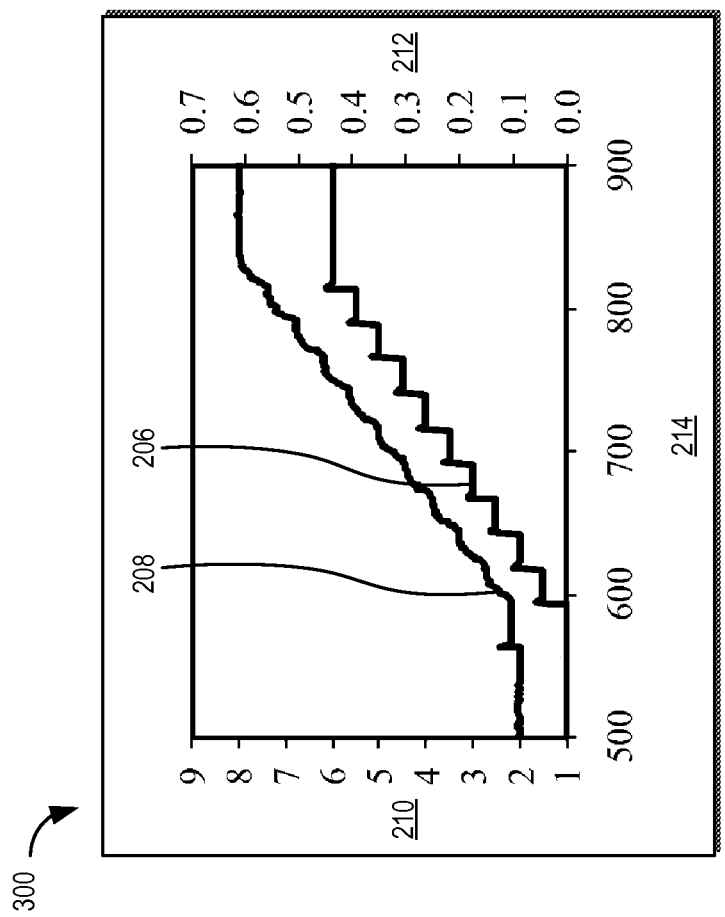
FIG. 3 illustrates a more detailed graph showing an exemplary relationship between oxygen concentration and current density in a cathode of a PEMFC system consistent with embodiments disclosed herein.

FIG. 3 illustrates a more detailed graph 300 showing an exemplary relationship between oxygen concentration 206 and current density 208 in a cathode of a PEMFC system consistent with embodiments disclosed herein. As illustrated in FIGS. 2-3, in certain embodiments, as cathode oxygen concentration 206 is increased (e.g., by actuation of an EGR valve in a cathode loop or the like), current density 208 of an associated PEMFC system may also increase. In this manner, cathode oxygen concentration 206 may be tuned by selectively actuating an EGR valve in an associated cathode loop to achieve certain desired PEMFC system current density 208 and/or voltage levels. For example, cathode oxygen concentration 206 may be controlled to influence limiting currents of the PEMFC system at higher power outputs and/or voltage response of the PEMFC system at lower power outputs.

Figure 4:
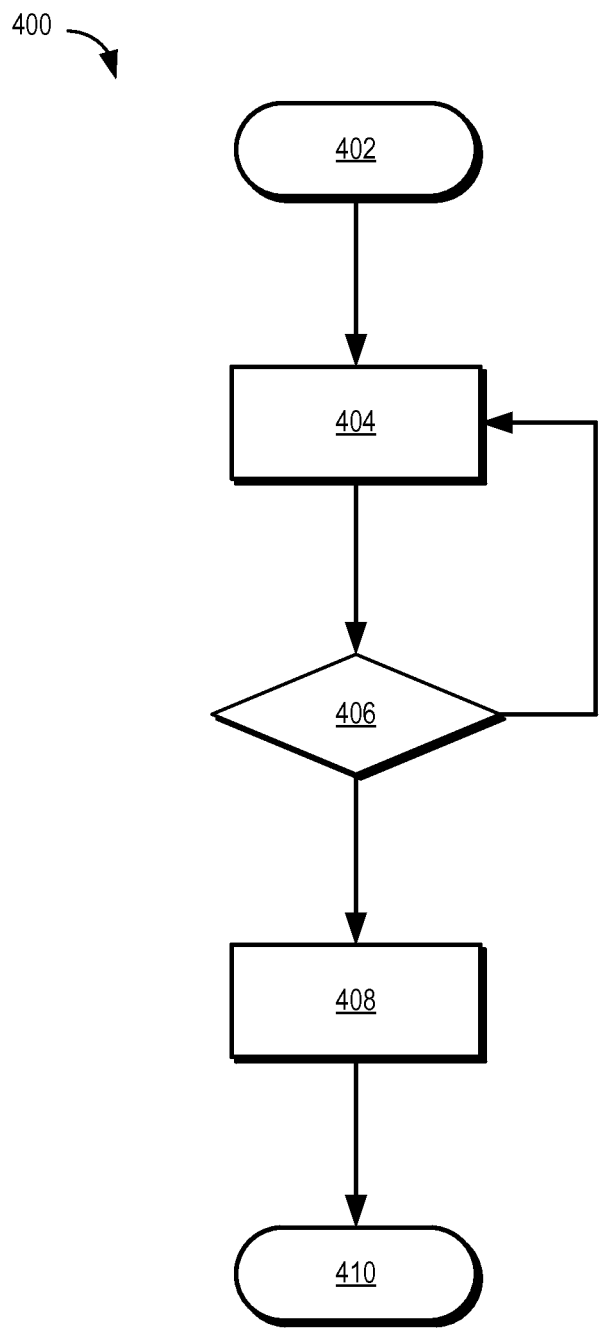
FIG. 4 illustrates a flow chart of an exemplary method for managing oxygen concentration in a cathode of a PEMFC system consistent with embodiments disclosed herein.

FIG. 4 illustrates a flow chart of an exemplary method 400 for managing oxygen concentration in a cathode of a PEMFC system consistent with embodiments disclosed herein. The illustrated method 400 may be performed using, at least in part, a control system and/or one or more valves associated with a cathode loop of a PEMFC system such as an EGR valve, although other suitable systems and/or combination of systems may also be utilized.

The method 400 may begin at 402. In certain embodiments, the method 400 may initiate based on initiation of contaminant removal and/or voltage recovery operations. In further embodiments, the method 400 may initiate in connection with voltage profile control operations of an associated PEMFC system stack and, among other things, be used to improve efficiency and/or durability of the stack.

At 404, an EGR valve included in a cathode loop of the PEMFC system may be actuated. In certain embodiments, actuating the EGR valve may allow cathode exhaust gas to be recirculated through the cathode of the PEMFC system (e.g., via an associated compressor system or the like), thereby lowering oxygen concentration within the cathode of the PEMFC system. In certain embodiments, the EGR may be actuated to a first position of a plurality of positions, thereby allowing a first amount of cathode exhaust gas to be recirculated through the cathode of the PEMFC system.

At 406, it may be determined whether an output voltage of the PEMFC system has reached a certain threshold level. In certain embodiments, the threshold may be determined based of modeling and/or characterization or other testing of the PEMFC system and/or a similar PEMFC system. In further embodiments, the threshold may be associated with a particular oxygen concentration within the cathode of the PEMFC system. For example, in some embodiments, a direct feedback system may be utilized in connection with a characterization process where at a constant load and cathode stoichiometry, it may be determined how increasing cathode exhaust gas recirculation correlates with changes to the output voltage of the PEMFC system (e.g., how voltage decreases with increasing recirculation). In further embodiments, a feedback system may be utilized in connection with varying cathode exhaust gas recirculation to achieve a particular output voltage. For example, a target output voltage may be set and a position of the EGR value may be changed and/or otherwise iterated through various positions to meet the targeted output voltage. If the output voltage has reached the threshold level, the method 400 may proceed to 408, where a suitable operation associated with a particular oxygen concentration level in the cathode may be performed. For example, in some embodiments, anion contaminant removal operations from the cathode of the PEMFC system may be performed. In other embodiments, other PEMFC conditioning operations including voltage profile control operations may be performed. In yet further embodiments, no specific operation may be performed at 408 in connection with the method 400.

If the output voltage has not reached the threshold level, the method 400 may return to 404. At 404, the EGR valve may continue to be actuated so as to allow cathode exhaust gas to continue to recirculate through the cathode of the PEMFC system, thereby lowering oxygen concentration within the cathode of the PEMFC system. In further embodiments, the EGR may be actuated to a second position of the plurality of positions, thereby allowing a second amount of cathode exhaust gas to be recirculated through the cathode of the PEMFC system. In certain embodiments, the second amount may be greater than the first amount of cathode exhaust gas. Accordingly, actuating the EGR valve to the second position may result in lower oxygen concentrations in the cathode of the PEMFC system than actuating the EGR valve to the first position. The method 400 may continue to 406 where, if the output voltage of the PEMFC has reached the threshold level, the method 400 may proceed to 408. At 408, a suitable operation associated with a particular oxygen concentration level in the cathode may be performed. The method may proceed to end at 410.

Certain systems and methods disclosed herein may be implemented, at least in part, using one or more computer systems. For example, in certain embodiments, a control system associated with a PEMFC system may be implemented, at least in part, using one or more computer systems. The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. For example, in certain embodiments, the systems and methods disclosed herein may be utilized in FC systems not included in a vehicle (e.g., as in back-up power sources or the like). It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "in communication," "coupled," "coupling," and any other variation thereof are intended to encompass a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A fuel cell system comprising:
a cathode compartment;
a compressor coupled to the cathode compartment configured to receive an input cathode gas via a compressor input and supply the input cathode gas to the cathode compartment via a compressor output;

an exhaust gas recirculation valve coupled to the cathode compartment configured to receive a cathode exhaust gas output and to selectively provide at least a portion of the cathode exhaust gas output to the compressor input; and a control system configured to control the operation of the exhaust gas recirculation valve, to receive measurement information associated with an output voltage of the fuel cell system, and to implement at least one operation of the fuel cell system associated with a particular oxygen concentration threshold level in the cathode compartment based on the measurement information exceeding at least one threshold, the at least one operation comprising a cathode anion contaminant removal operation;

wherein the compressor is further configured to supply the at least a portion of the cathode exhaust gas output to the cathode compartment via the compressor output.

2. The system of claim 1, wherein the input cathode gas comprises ambient air.

3. The system of claim 1, wherein the input cathode gas comprises oxygen.

4. The system of claim 1, wherein the control system is configured to control the operation of the exhaust gas recirculation valve by selectively actuating the exhaust gas recirculation valve.

5. The system of claim 4, wherein the control system is configured to selectively actuate the exhaust gas recirculation valve based on feedback information associated with the fuel cell system.

6. The system of claim 5, wherein the feedback information comprises an output voltage of the fuel cell system.

7. The system of claim 6, wherein the feedback information comprises an oxygen concentration in the cathode compartment.

8. A method for managing oxygen concentration in a cathode compartment of a fuel cell system, the method comprising:

receiving an input cathode gas at a compressor input;

supplying the input cathode gas to the cathode compartment from a compressor output;

receiving a cathode gas output at an exhaust gas recirculation valve;

controlling the operation of the exhaust gas recirculation valve using the fuel cell control system by selectively providing at least a portion of the cathode gas output from the exhaust gas recirculation valve to the compressor input;

supplying the at least a portion of the cathode exhaust gas output to the cathode compartment from the compressor output;

receiving measurement information associated with an output voltage of the fuel cell system; and implementing at least one operation of the fuel cell system associated with a particular oxygen concentration threshold level in the cathode compartment based on the measurement information exceeding at least one threshold, the at least one operation comprising a cathode anion contaminant removal operation.

9. The method of claim 8, wherein controlling the operation of the exhaust gas recirculation valve comprises selectively actuating the exhaust gas recirculation valve.

10. The system of claim 9, wherein selectively actuating the exhaust gas recirculation valve comprises selectively actuating the exhaust gas recirculation valve based on feedback information associated with the fuel cell system.

11. The system of claim 10, wherein the feedback information comprises an output voltage of the fuel cell system.

12. The system of claim 10, wherein the feedback information comprises an oxygen concentration in the cathode compartment.

* * * * *